United States Patent [19]

McCurry

[11] Patent Number: 5,143,494

[45] Date of Patent: Sep. 1, 1992

[54] DEPTH OF CUT LOCK MECHANISM FOR A PLUNGE TYPE ROUTER

[75] Inventor: Ronald C. McCurry, West Union, S.C.

[73] Assignee: Ryobi Motor Products Corp., Easley, S.C.

[21] Appl. No.: 779,073

[22] Filed: Oct. 18, 1991

[51] Int. Cl.⁵ .......................... B27C 5/10; B23C 1/20
[52] U.S. Cl. ........................ 409/182; 144/134 D; 144/136 C; 408/241.5; 409/218
[58] Field of Search ............. 409/218, 178, 180, 182; 408/241.5; 144/134 D, 136 C

[56] References Cited

U.S. PATENT DOCUMENTS

| | | | |
|---|---|---|---|
| 3,447,011 | 5/1969 | Zelik | 144/134 D |
| 4,319,860 | 3/1982 | Beares | 409/182 |
| 4,562,872 | 1/1986 | Fushiya et al. | 144/134 |
| 4,938,642 | 7/1990 | Imahashi et al. | 144/136 C |

*Primary Examiner*—W. Donald Bray
*Attorney, Agent, or Firm*—Brooks & Kushman

[57] ABSTRACT

A plunge type router including an arrangement for locking the depth of cut adjustment which does not require the operator to release the grip on the router handle. The locking mechanism is activated by an actuator arm mounted for pivoting movement within the handle. Pivoting of the actuator arm causes a stop plug to be pressed against a guide tube displaceably coupling the router base plate to the router motor housing.

10 Claims, 4 Drawing Sheets

DEPTH OF CUT LOCK MECHANISM FOR A PLUNGE TYPE ROUTER

BACKGROUND OF THE INVENTION

This invention relates to plunge type routers and, more particularly, to an arrangement for locking the router at a desired depth of cut.

Plunge type routers are similar to conventional routers in that they include a drive motor secured within a motor housing, the motor having a shaft which extends outwardly beyond the lower end of the motor housing, with the shaft adapted to have a cutting tool secured thereto. The router also includes a base plate which is displaceable substantially vertically relative to the motor housing. In conventional non-plunge type routers, the motor is locked in position relative to the base plate such that the cutting tool projects axially beyond the lower workpiece engaging surface of the base plate to the desired depth of cut at all times. However, plunge type routers provide biasing means which operate to retract the cutting tool above the workpiece engaging surface of the base plate during periods of non-use. In order to enable a plunge type router to be "plunged" to the desired cutting depth, such routers are also commonly provided with adjustable depth stop systems and may also include arrangements for locking the motor housing relative the base plate at preselected positions, such as the cutting depth. It is therefore a primary object of this invention to provide a depth of cut locking arrangement for use with a plunge type router.

Plunge type routers typically include a pair of handles by means of which the operator may hold and guide the router during use. These handles are also used when the operator "plunges" the router to its desired depth of cut. Once at the desired depth of cut, the motor housing and base plate are preferably locked relative to each other so that the operator may concentrate on guiding the router without at the same time maintaining sufficient downward pressure on the motor housing to maintain the desired depth of cut. However, if the operator must release his grip on the router handle in order to effect the locking function, this may result in an inadvertent change of the depth of cut. It is therefore another object of the present invention to provide such a depth of cut locking mechanism wherein the operator does not have to release the handle.

It is a further object of this invention to provide a release mechanism for the locking arrangement.

Since the parts of a router are subject to wear, it is yet another object of the present invention to include in the locking arrangement some means to provide adjustable compensation for such wear.

SUMMARY OF THE INVENTION

The foregoing, and additional, objects are attained in accordance with the principles of this arrangement by providing a plunge type router comprising a motor housing with a drive motor secured therein, the motor having a shaft extending outwardly from the lower end of the motor housing and adapted to have a cutting tool secured thereto, a base plate displaceable substantially vertically relative the motor housing, means for guiding the displacement of the base plate including a hollow guide sleeve secured to the motor housing and a guide tube secured to the base plate, the guide tube being arranged for sliding movement within the guide sleeve and the guide sleeve being formed with a lateral opening exposing the guide tube, a plug member, a hollow member having exterior threads at one end so as to be threadedly secured to the motor housing, the interior of the hollow member having a major axis substantially perpendicular to the major axes of the guide tube and the guide sleeve and co-linear with the axis of the exterior threads, the interior of the hollow member communicating with the guide sleeve lateral opening, and said plug member being captured within the hollow member interior so as to extend through the lateral opening, and means for rotating the hollow member about the interior major axis.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
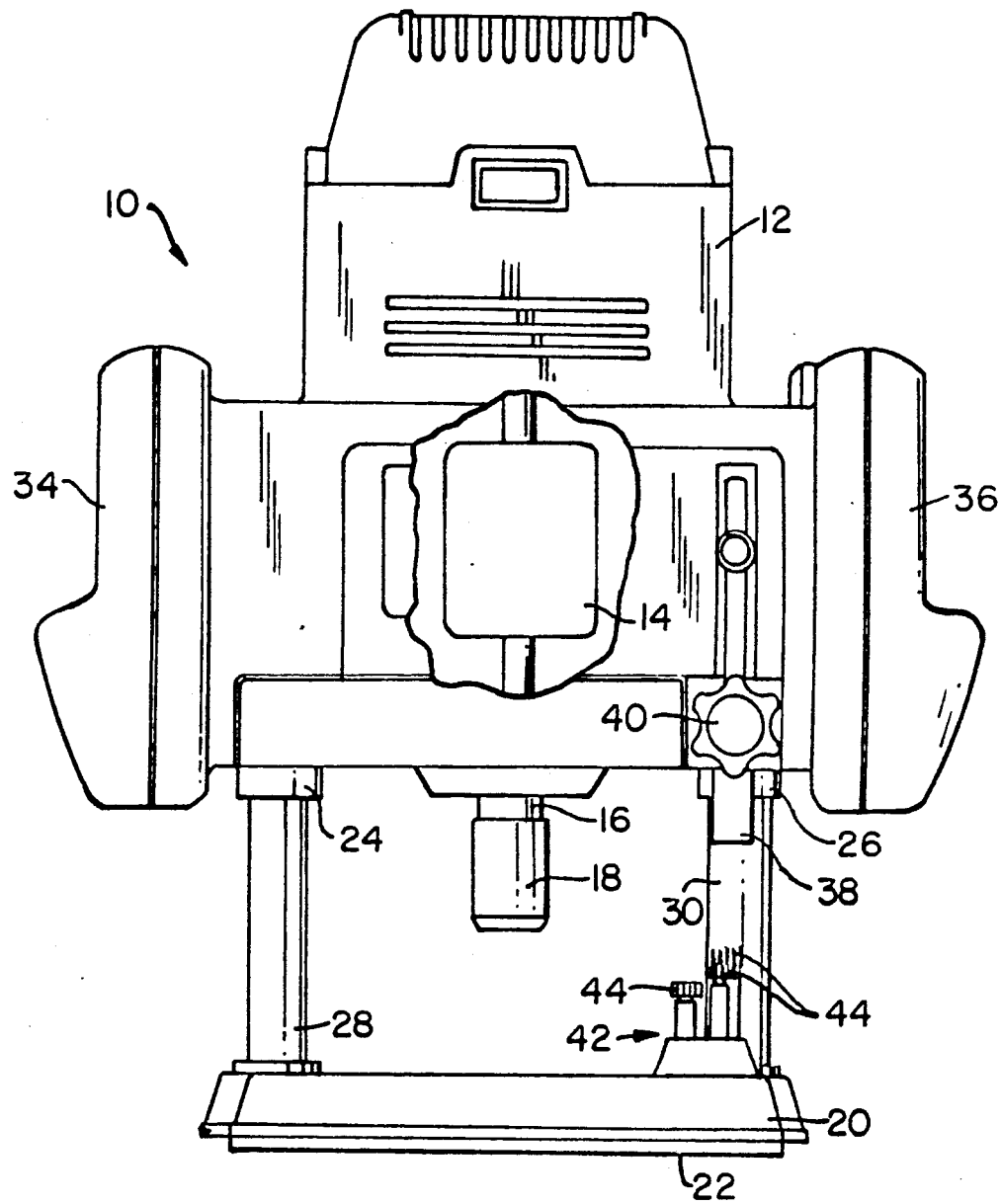
FIG. 1 is an elevational view of a plunge type router in which the principles of this invention may be incorporated.

Referring now to the drawings, FIG. 1 illustrates a plunge type router, designated generally by the reference numeral 10, incorporating an arrangement constructed according to this invention. The router 10 includes a motor housing 12 in which a drive motor 14 is secured, in a conventional manner. The motor 14 has a shaft 16 which extends outwardly from the lower end of the motor housing 12. At the distal end of the shaft 16, there is a collet, or chuck, 18 adapted to hold a cutting tool.

Figure 2:
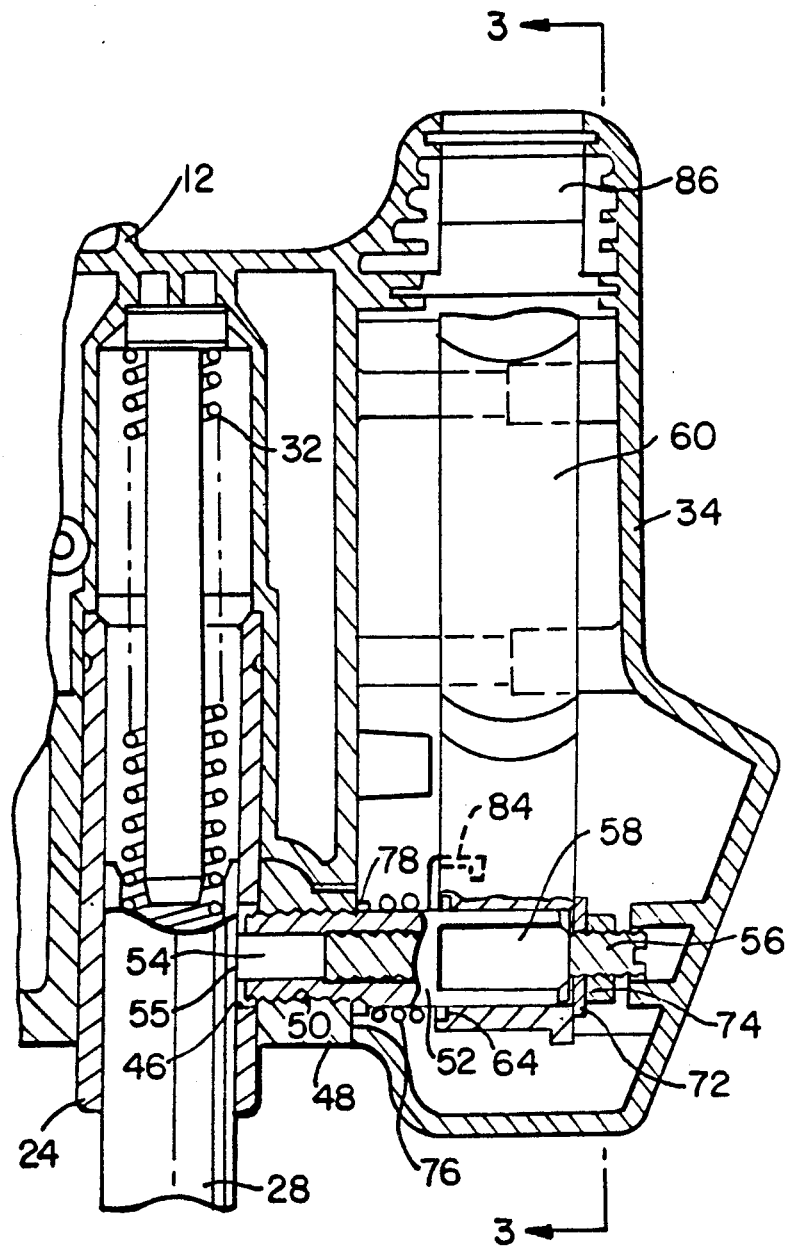
FIG. 2 is a cross sectional view illustrating the locking arrangement according to this invention incorporated in the router of FIG. 1.

The router 10 also includes a base plate 20 having a work engaging lower surface 22. The base plate 20 is displaceable substantially vertically relative to the motor housing 12. To effect and guide such displacement, hollow guide sleeves 24 and 26 are secured to the motor housing 12 and guide tubes 28 and 30 are secured to the base plate 20. The guide tubes 28 and 30 are arranged for sliding movement within the guide sleeves 24 and 26, respectively, so that a constant relative orientation between the base plate 20 and the motor housing 12 is maintained while at the same time allowing the base plate 20 to be displaced relative to the motor housing 12. As is conventional, the base plate 20 and the motor housing 12 are biased away from each other. Therefore, within each of the guide sleeves 24, 26, there is a spring 32 (FIG. 2) for providing a separating force.

When using a plunge type router of the type illustrated herein, the operator places the lower surface 22 of the base plate 20 on an upper surface of a workpiece. The handles 34 and 36, which are part of the motor housing 12, are gripped by the operator and the motor housing 12 is displaced downwardly against the force of the spring 32 until the cutting tool attached to the collet 18 is at the desired depth of cut in the workpiece beneath the lower surface 22. The depth of cut may be preset by an arrangement including the stop bar 38 supported on the motor housing 12 for relative vertical displacement in a guide (not shown) and securable in the guide by a clamp 40. A turret assembly 42 is rotatably mounted on the base plate 20 and includes fixed abutments (not shown) and adjustable abutments 44 which cooperate with the lower end of the stop bar 38 to achieve the desired depth of cut. Once the desired relative displacement between the base plate 20 and the motor housing 12 is attained, it is desirable to secure that position in order that the operator may guide the router 10 without being concerned with maintaining the relative displacement against the return force of the spring 32.

According to this invention, there is provided an arrangement for locking the relative positions of the motor housing 12 and the base plate 20 for the desired depth of cut. Thus, the guide sleeve 24 is formed with a lateral opening 46 (FIG. 2) at an appropriate location so that it always exposes the guide tube 24. The opening 46 is in line with the handle 34 and a boss 48 formed as part of the housing 12. The boss 48 has an opening 50 aligned with the opening 46. The opening 50 is formed with internal screw threads and the opening 46 is larger than the opening 50.

For effecting the locking function, a clamp bolt 52 is provided. The clamp bolt 52 is externally threaded at one end and is threadedly secured in the screw threads of the opening 50. The interior of the clamp bolt 52 is hollow with a major axis substantially perpendicular to the major axes of the guide sleeve 24 and the guide tube 28 when it is secured as described above. This hollow interior of the clamp bolt 52 is formed with internal screw threads over substantially its entire length, but is smooth and free from internal screw threads in the region where the clamp bolt 52 is secured in the boss 48. A stop plug 54 is held partially within the interior of the clamp bolt 52 and is sized so that it can slide freely within the smooth region of the clamp bolt 52 interior. An end 55 of the stop plug 54 extends outwardly from the interior of the clamp bolt 52. An exteriorly threaded set screw 56 is threadedly secured to the interior threads of the clamp bolt 52 to limit the movement of the stop plug 54 inwardly of the interior of the clamp bolt 52, as will be described in full detail hereinafter.

The clamp bolt 52 is formed with a flatted region 58 and there is provided an actuator arm 60 formed with openings 62 through which the clamp bolt 52 extends. To secure the clamp bolt 52 to the actuator arm 60 in a relative non-rotative manner, a stop washer 64 is provided having a flatted opening 66 which is complemental to the flatted region 58 of the clamp bolt 52. The stop washer 64 has exterior flats 68 and fits in a complemental recess 70 of the actuator arm 60 which surrounds the opening 62. The aforedescribed assembly is secured by the washer 72 and the lock nut 74. A torsion spring 76 surrounds the clamp bolt 52 between the retaining ring 78 and the actuator arm 60. The torsion spring 76 has a first end tang 80 which is inserted in one of a plurality of anchor holes 82 formed in the motor housing 12 and a second end tang 84 which engages the actuator arm 60 so that the actuator arm 60 is biased counterclockwise, as viewed in FIG. 3, to unscrew the clamp bolt 52 from the opening 50. The purpose of having a plurality of anchor holes 82 is to provide adjustability of the return force of the torsion spring 76.

Figure 3:
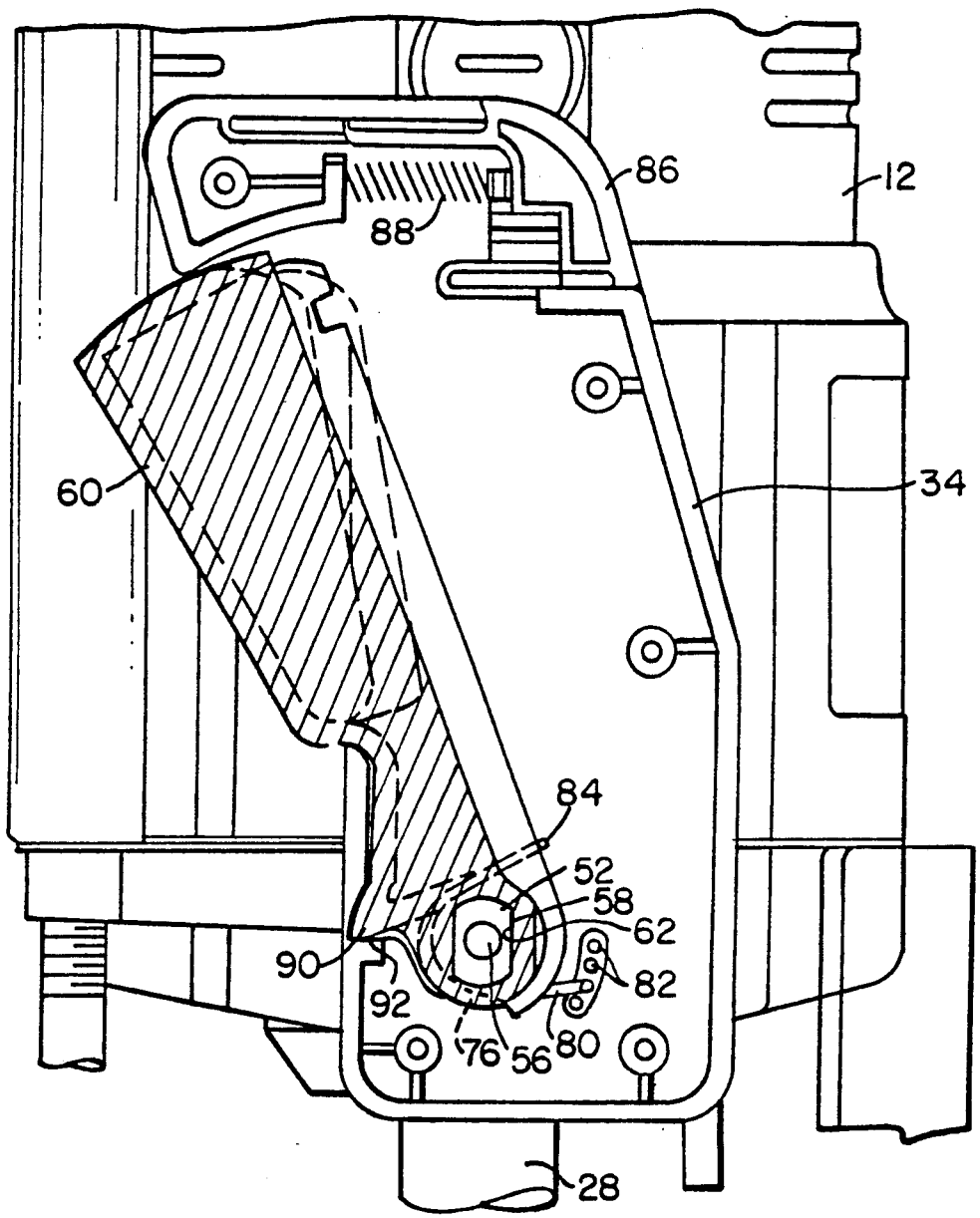
FIG. 3 is a cross sectional view taken along the line 3—3 in FIG. 2.
Figure 4:
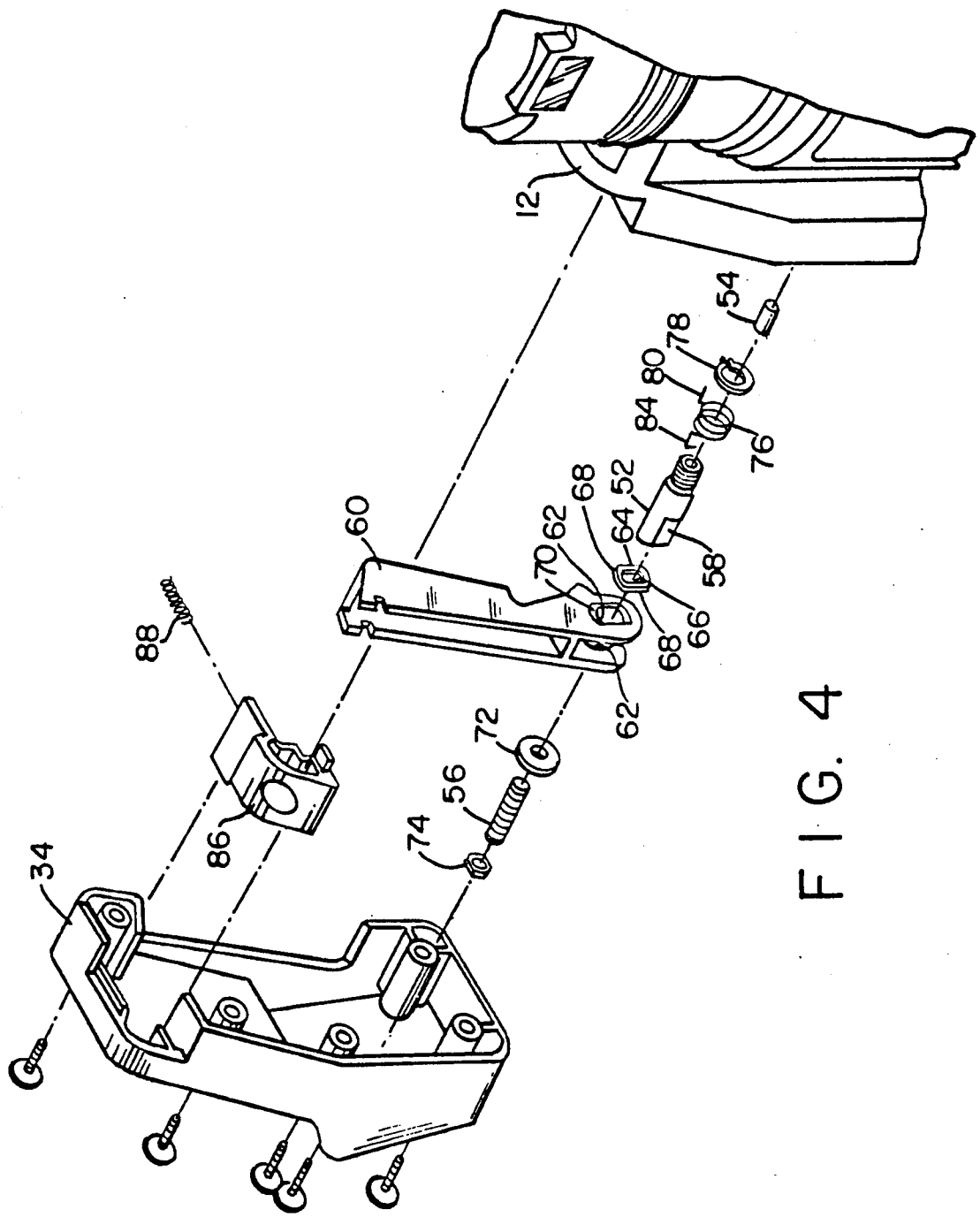
FIG. 4 is an exploded perspective view of the locking arrangement according to this invention.

In operation, after the operator has moved the motor housing 12 downwardly to the desired depth of cut, the actuator arm 60 is squeezed relative the handle 34 so that it is pivoted clockwise, as viewed in FIG. 3. This operation is effected without requiring the operator to release the handle 34. This pivoting of the actuator arm 60 causes the clamp bolt 52 to be more tightly threaded into the openings 46 and 50 and to press the stop plug 54, which extends outwardly from the open end of clamp bolt 52, against the guide tube 28. Typically, the guide tube 28 is formed of a relatively hard material, such as steel, and therefore, preferably, the stop plug 54 is formed of a relatively soft material, such as brass. When the actuator arm 60 is pivoted to a locking position where the stop plug 54 is pressed in locking engagement against the guide tube 28, the friction induced by this locking engagement is sufficient to maintain the actuator arm 60 in its locking position, even against the opposing force exerted by the torsion spring 76. To release the actuator from this locking position, a release button 86 is provided. The release button 86 is slidingly received in the upper portion of the handle 34 and is biased outwardly by the spring 88. The operator forces the release button 86 inwardly of the handle 34 to cause it to pivot the actuator arm 60 counterclockwise, as viewed in FIG. 3, sufficiently to reduce the locking engagement friction so that the torsion spring 76 can pivot the actuator arm 60 until the projection 90 of the actuator arm 60 engages the interfering abutment 92 of the motor housing 12.

The purpose of the set screw 56 is twofold. For one, the set screw 56 abuts against the stop plug 54 to prevent the stop plug 54 from moving toward the right, as viewed in FIG. 2, when the actuator arm 60 is pivoted. The second purpose of the set screw 56 is to provide an adjustment function to compensate for wear and insure that the small amount of rotation of which the actuator arm 60 may partake is sufficient to move the stop plug 54 into locking engagement against the guide tube 28.

Accordingly, there has been disclosed an improved plunge type router depth of cut locking mechanism. While a preferred embodiment of the present invention has been disclosed herein, it is understood that various modifications and adaptations to the disclosed arrangement will be apparent to those of ordinary skill in the art and it is only intended that this invention be limited by the scope of the appended claims.

I claim:

1. A plunge type router comprising:
   a motor housing with a drive motor secured therein, said motor having a shaft extending outwardly from the lower end of said motor housing and adapted to have a cutting tool secured thereto;
   a base plate displaceable substantially vertically relative said motor housing;
   means for guiding the displacement of said base plate including a hollow guide sleeve secured to said motor housing and a guide tube secured to said base plate, said guide tube being arranged for sliding movement within said guide sleeve and said guide sleeve being formed with a lateral opening exposing said guide tube;
   a plug member;
   a hollow member having exterior threads at one end so as to be threadedly secured to said motor housing, the interior of said hollow member having a major axis substantially perpendicular to the major axes of said guide tube and said guide sleeve and co-linear with the axis of said exterior threads, the interior of said hollow member communicating with said guide sleeve lateral opening, and said plug member being captured within said hollow member interior so as to extend through said lateral opening; and means for rotating said hollow member about said interior major axis.

2. The router according to claim 1 further including means for adjusting the position of said plug member within said hollow member.

3. The router according to claim 2 wherein the interior of said hollow member is formed with a region of screw threads having an axis co-linear with said hollow member interior major axis, and said adjusting means includes a set screw threadedly engaged with the interior threads of said hollow member, an end of said set screw abutting an end of said plug member within said hollow member.

4. The router according to claim 1 wherein said rotating means includes a pivotable actuator arm engaging said hollow member so as to be non-rotative with respect thereto.

5. The router according to claim 4 wherein when said actuator arm is pivoted to a locking position where said plug member is in locking engagement against said guide tube, the friction induced by the locking engagement is sufficient to maintain said actuator arm in said locking position, the router further including means for releasing said actuator arm from said locking position.

6. The router according to claim 5 further including means for yieldably biasing said actuator arm away from said locking position.

7. The router according to claim 6 wherein said biasing means includes a torsion spring surrounding said hollow member, said torsion spring having a first end tang engaging said motor housing and a second end tang engaging said actuator arm.

8. The router according to claim 7 wherein said motor housing is formed with a plurality of anchor holes and said first end tang of said torsion spring is inserted in a selected one of said anchor holes, whereby the biasing force exerted by said torsion spring is adjustable.

9. The router according to claim 4 wherein the exterior of said hollow member is substantially cylindrical in shape and includes a flatted region, said actuator arm engaging said flatted region.

10. The router according to claim 4 further including a handle, said actuator arm being mounted within said handle so as to be accessible to an operator of the router while the operator is holding the handle.

* * * * *